United States Patent
Litke et al.

(10) Patent No.: US 9,959,176 B2
(45) Date of Patent: May 1, 2018

(54) FAILURE RECOVERY IN SHARED STORAGE OPERATIONS

(71) Applicant: Red Hat, Inc., Raleigh, NC (US)

(72) Inventors: Adam Litke, Bethel Park, PA (US); Nir Soffer, Raanana (IL); Liron Aravot, Raanana (IL)

(73) Assignee: Red Hat Inc., Raleigh, NC (US)

( * ) Notice: Subject to any disclaimer, the term of this patent is extended or adjusted under 35 U.S.C. 154(b) by 0 days. days.

(21) Appl. No.: 15/055,861

(22) Filed: Feb. 29, 2016

(65) Prior Publication Data

US 2017/0242755 A1 Aug. 24, 2017

Related U.S. Application Data

(60) Provisional application No. 62/298,118, filed on Feb. 22, 2016.

(51) Int. Cl.
- *G06F 11/00* (2006.01)
- *G06F 11/14* (2006.01)
- *G06F 3/06* (2006.01)
- *G06F 9/455* (2018.01)

(52) U.S. Cl.
CPC ........ *G06F 11/1451* (2013.01); *G06F 3/0604* (2013.01); *G06F 3/065* (2013.01); *G06F 3/0665* (2013.01); *G06F 3/0667* (2013.01); *G06F 3/0673* (2013.01); *G06F 9/45545* (2013.01); *G06F 2201/805* (2013.01); *G06F 2201/825* (2013.01)

(58) Field of Classification Search
USPC .......................................................... 714/19
See application file for complete search history.

(56) References Cited

U.S. PATENT DOCUMENTS

| | | |
|---|---|---|
| 5,828,876 A | 10/1998 | Fish et al. |
| 7,356,730 B2 | 4/2008 | Ulrich et al. |
| 7,406,473 B1 | 7/2008 | Brassow et al. |
| 7,788,243 B2 | 8/2010 | Pasupuleti et al. |
| 8,392,388 B2 | 3/2013 | Pasupuleti et al. |
| 8,930,333 B1 | 1/2015 | Prince et al. |
| 2002/0165942 A1 | 11/2002 | Ulrich et al. |
| 2004/0068695 A1* | 4/2004 | Daniell ................ G06Q 10/107 715/234 |
| 2004/0221125 A1 | 11/2004 | Ananthanarayanan et al. |
| 2006/0053139 A1 | 3/2006 | Marzinski et al. |
| 2011/0131193 A1 | 6/2011 | Pasupuleti et al. |

(Continued)

OTHER PUBLICATIONS

Litke, Adam, "Sweep Away the Garbage for Scalable, Fault-Tolerant Shared VM Storage", redhat.com, FOSDEM, Jan. 30, 2016, pp. 1-82.

(Continued)

*Primary Examiner* — Sarai E Butler
(74) *Attorney, Agent, or Firm* — Lowenstein Sandler LLP

(57) ABSTRACT

Systems and methods for failure recovery in shared storage operations. An example method comprises: acquiring a lock with respect to a storage domain comprising a specified disk image; creating a transaction marker associated with the disk image; creating a component of a new volume associated with the disk image; destroying the transaction marker; and releasing the lock with respect to the storage domain.

14 Claims, 8 Drawing Sheets

(56) References Cited

U.S. PATENT DOCUMENTS

| | | | | |
|---|---|---|---|---|
| 2012/0166928 | A1* | 6/2012 | Stern | G06F 17/243 |
| | | | | 715/223 |
| 2012/0233139 | A1* | 9/2012 | Larson | G06F 17/30545 |
| | | | | 707/703 |
| 2014/0068127 | A1* | 3/2014 | Baron | G06F 9/526 |
| | | | | 710/200 |
| 2014/0208163 | A1* | 7/2014 | Domke | G05B 23/00 |
| | | | | 714/37 |
| 2016/0371190 | A1* | 12/2016 | Romanovskiy | G06F 3/067 |
| 2017/0068686 | A1* | 3/2017 | Broido | G06F 17/30203 |

OTHER PUBLICATIONS

Litke, Adam, "Introduce the New Create Volume Command", Feb. 23, 2015, 3 pages https://gerrit.ovirt.org/#/c/38097/1.

Litke, Adam, "Introduce the New Create Voume Command—vdsClient.py", gerrit.ovirt.org, Feb. 23, 2015, 1 page https://gerrit.ovirt.org/#/c/38097/1/client/vdsClient.py.

Litke, Adam, "vdsm/vdsm/API.py" Red Hat, Inc., 2012-2014, 1 page https://gerrit.ovirt.org/#/c/38097/1/vdsm/API.py.

Litke, Adam, "BindingXMLRPC.py", gerrit.ovirt.org, Feb. 23, 2015, 1 page https://gerrit.ovirt.org/#/c/38097/1/vdsm/rpc/BindingXMLRPC.py.

Litke, Adam, "vdsmapi-schema.json", gerrit.ovirt.org, Feb. 23, 2105, 1 page https://gerrit.ovirt.org/#/c/38097/1/vdsm/rpc/vdsmapi-schema.json.

Litke, Adam, "vdsm/storage/hsm.py", gerrit.ovirt.org, Feb. 23, 2015, 1 page https://gerrit.ovirt.org/#/c/38097/1/vdsm/storage/hsm.py.

Litke, Adam, "vdsm/storage/monitor.py", gerrit.ovirt.org, Feb. 23, 2015, 1 page https://gerrit.ovirt.org/#/c/38097/1/vdsm/storage/monitor.py.

Litke, Adam, "vdsm/storage/sdm/_init_.py", gerrit.ovirt.org, Feb. 23, 2015, 1 page https://gerrit.ovirt.org/#/c/38097/1/vdsm/storage/sdm/_init_.py.

Litke, Adam, "vdsm/storage/sdm/blockstore.py", gerrit.ovirt.org, Feb. 23, 2015, 1 page https://gerrit.ovirt.org/#/c/38097/1/vdsm/storage/sdm/blockstore.py.

Litke, Adam, "vdsm/storage/sdm/filestore.py", gerrit.ovirt.org, Feb. 23, 2015, 1 page https://gerrit.ovirt.org/#/c/38097/1/vdsm/storage/sdm/filestore.py.

Litke, Adam, "vdsm/storage/sdm/volumestore.py", gerrit.ovirt.org, Feb. 23, 2015, 1 page https://gerrit.ovirt.org/#/c/38097/1/vdsm/storage/sdm/volumestore.py.

* cited by examiner

FAILURE RECOVERY IN SHARED STORAGE OPERATIONS

CROSS-REFERENCE TO RELATED APPLICATION

This application claims the priority benefit of U.S. Provisional Patent Application No. 62/298,118, filed Feb. 22, 2016, the entirety of which is incorporated herein by reference.

TECHNICAL FIELD

The present disclosure is generally related to virtualized computer systems, and is more specifically related to virtual machine storage management.

BACKGROUND

Virtualization may be viewed as abstraction of some physical components into logical objects in order to allow running various software modules, for example, multiple operating systems, concurrently and in isolation from other software modules, on one or more interconnected physical computer systems. Virtualization allows, for example, consolidating multiple physical servers into one physical server running multiple virtual machines in order to improve the hardware utilization rate. Virtualization may be achieved by running a software layer, often referred to as "hypervisor," above the hardware and below the virtual machines. A hypervisor may run directly on the server hardware without an operating system beneath it or as an application running under a traditional operating system. A hypervisor may abstract the physical layer and present this abstraction to virtual machines to use, by providing interfaces between the underlying hardware and virtual devices of virtual machines. Processor virtualization may be implemented by the hypervisor scheduling time slots on one or more physical processors for a virtual machine, rather than a virtual machine actually having a dedicated physical processor. Memory virtualization may be implemented by employing a page table (PT) which is a memory structure translating virtual memory addresses to physical memory addresses.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Described herein are methods and systems for failure recovery in shared storage operations.

A distributed computer system may comprise a plurality of host computer systems managed by a virtualization manager. Each host computer system may be communicatively coupled, via a network, to one or more storage domains that store disk images of virtual machines. "Storage domain" herein refers to an atomic storage unit, such as a mount point or a folder for a file based storage, or a group of logical unit numbers (LUNs) for a block-based storage. In various illustrative examples, storage domains may employ file-based or block-based storage for storing one or more virtual machine disk images, the domain metadata and the domain lease. The domain metadata represents information that may be utilized for domain identification, management, creation, modification, removal, and/or other operations. The domain lease represents information that may be utilized for managing access to the storage domain.

Each disk image may comprise one or more volumes. Each volume may comprise the volume data, the volume metadata, and the volume lease. The volume data area may be employed for storing the disk image data. The volume metadata area may be employed for storing references to associated volumes (e.g., to parent or child volumes in a copy-on-write chain) and/or other information that may be utilized for volume identification, management, creation, modification, removal, and/or for performing file operations with respect to the files stored on the volume. The volume lease area may be employed for storing the information that may be utilized for managing access to the volume.

The above-described multi-component structure of a volume results in complex storage-related operations, such as creating a volume, cloning a volume, or removing a volume. Therefore, each storage-related operation may involve a sequence of sub-operations to be performed on various objects of the storage domain. Some of those sub-operations may fail or never complete (e.g., due to power outages, network outages, hardware or software failures), thus leaving the storage in a non-predictable state. Certain recovery operations may need to be performed, proactively or at least responsive to detecting such a failure, in order to keep the storage in a coherent state.

Implementations of the present disclosure improve the operational efficiency of certain storage-related operations, including but not limited to creating a volume, cloning a volume, or removing a volume, by performing such operations in the transactional mode of execution, such that a failed or incomplete transaction would be rolled back, thus leaving various storage objects in their respective pre-transactional states. Various aspects of the above referenced methods and systems are described in details herein below by way of example, rather than by way of limitation.

Figure 1:
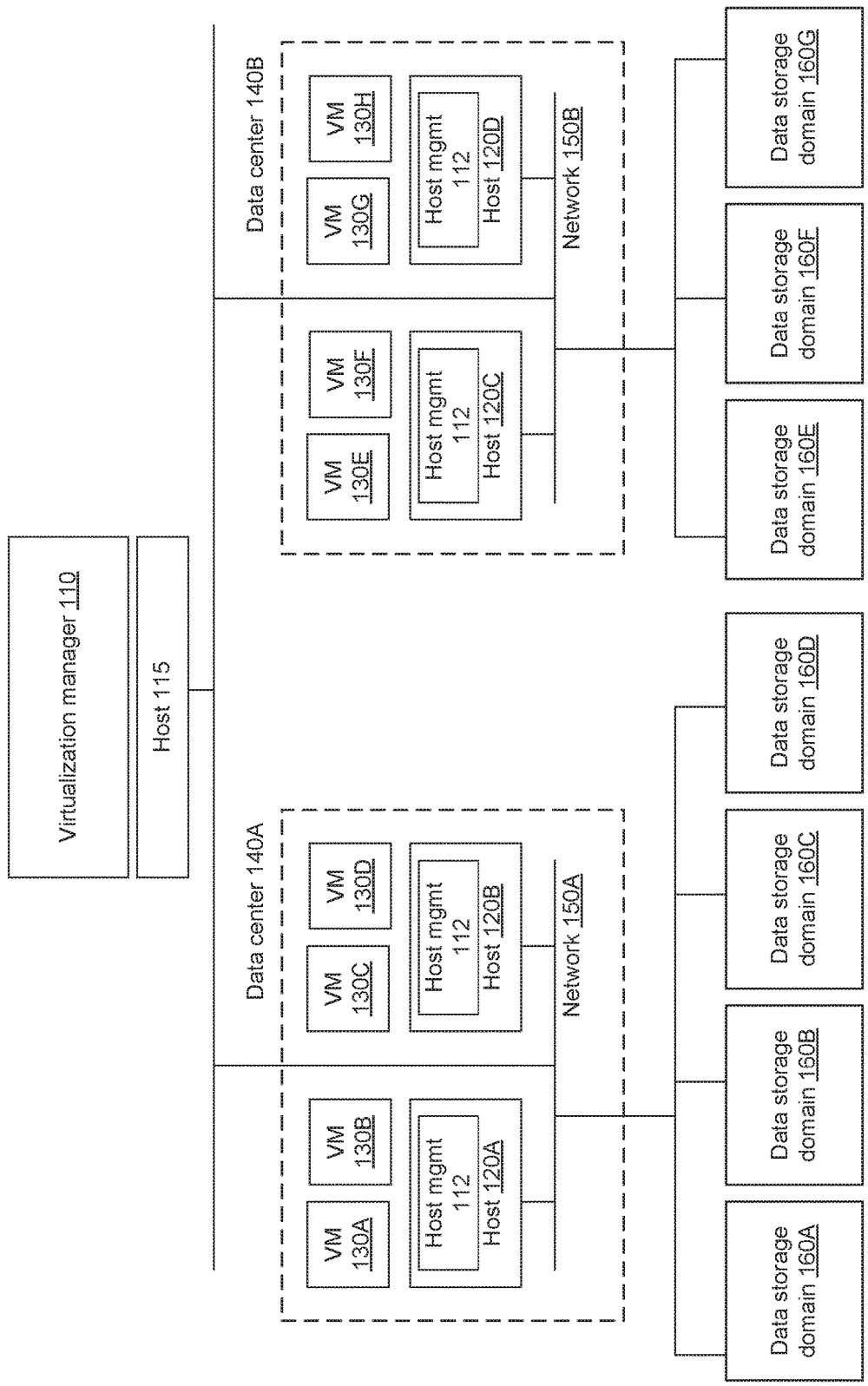
FIG. 1 depicts a high-level component diagram of one illustrative example of a distributed computer system 1000 representing a virtualized environment operating in accordance with one or more aspects of the present disclosure.

FIG. 1 depicts a high-level component diagram of one illustrative example of a distributed computer system 1000 representing a virtualized environment in which systems and methods described herein may operate. In the illustrative example of FIG. 1, distributed computer system 1000 comprises a virtualization manager 110 and a plurality of host computer systems 120A-120D grouped into one or more logical groups which may be also referred to as "data centers" or "clusters" 140A-140B. Virtualization manager 110 may include one or more software modules being executed by a host computer system 115 for centralized management of the virtualized environment. Virtualization manager 110 may comprise various interfaces, including administrative interface, reporting interface, and/or application programming interface (API) to communicate to host computers 120A-120D of the managed virtualized environment, as well as to user portals, databases, directory servers and various other components which are omitted from FIG. 1 for clarity.

Each of host computer systems 115, 120A-120D may comprise one or more processors communicatively coupled to memory devices and input/output (I/O) devices, as described in more details herein below with references to FIG. 7. Each of host computer systems 120A-120D may run a plurality of virtual machines 130A-130H, by executing a hypervisor to abstract the physical layer, including processors, memory, and I/O devices, and present this abstraction to the virtual machines as virtual devices. A virtual machine 130 may execute a guest operating system which may utilize the underlying virtual devices, including virtual processors, virtual memory, and virtual I/O devices. One or more applications may be running on virtual machine 130 under the guest operating system. Each host computer systems 120 may run a host management module 210 that manages and monitors various aspects of the host operation, including the storage, memory and network interfaces. In an illustrative example, host management module 112 may be provided by a Virtual Desktop and Server Management (VDSM) daemon.

In certain implementations, host computer systems 120A-120D may be grouped into one or more logical groups which may be also referred to as "data centers" 140A-140B. A data center may represent the highest level of abstraction in the virtualization model. Each data center 140 may be communicatively coupled, via a network 150, to one or more storage domains 160, including data storage domains 160A-160G. Data storage domains 160A-160G may store disk images of virtual machines 130.

While example systems and methods are described herein with references to various components of distributed computer system 1000, such systems and methods may also operate in distributed storage systems whose architecture may be different from that of system 1000, provided that such distributed storage systems implement a pair of atomic creating and object deleting operations.

Figure 2:
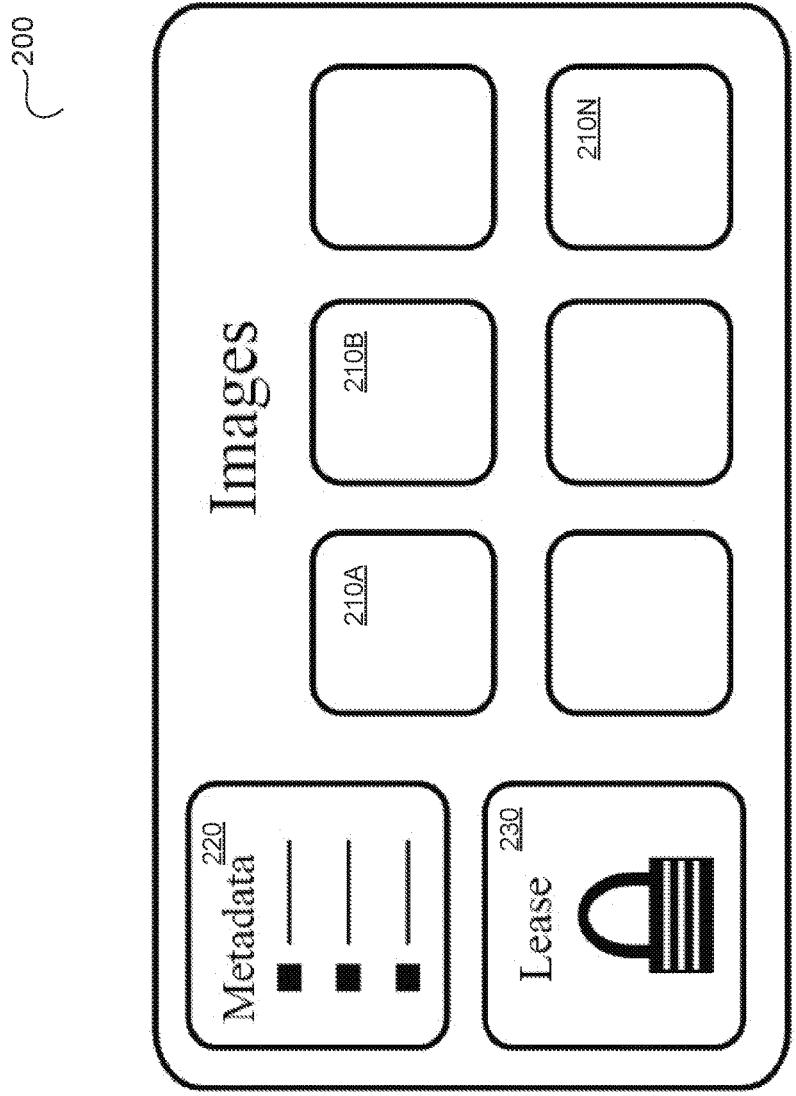
FIG. 2 schematically illustrates an example functional structure of a storage domain, in accordance with one or more aspects of the present disclosure.

FIG. 2 schematically illustrates an example functional structure of storage domain 200 operating in accordance with one or more aspects of the present disclosure. Example storage domain 200 may be employed for storing one or more virtual machine disk images 210A-210N, domain metadata 220 and domain lease 230. In an illustrative example, example storage domain 200 may employ file-based storage, in which case disk images 210, metadata 220, and lease 230 may be provided by respective files. In another illustrative example, example storage domain 200 may employ block-based storage, in which case disk images 210, metadata 220, and lease 230 may be provided by respective logical volumes.

Figure 3:
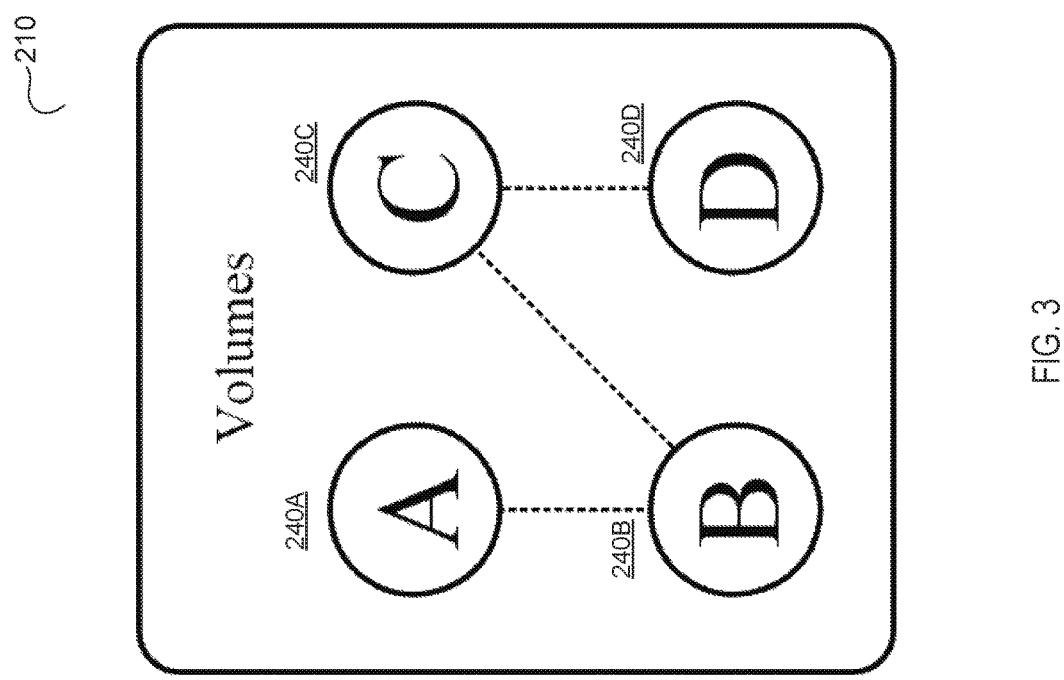
FIG. 3 schematically illustrates an example functional structure of a disk image, in accordance with one or more aspects of the present disclosure.

Each disk image 210 may comprise one or more volumes 240A-240D, as schematically illustrated by FIG. 3. In an illustrative example, a disk image may be represented by a volume chain comprising one or more copy-on-write (COW) volumes (which may also be referred to as "layers"). From the perspective of a virtual machine, these volumes appear as a single disk image, as the hypervisor presents the virtual disk to a virtual machine and implements the associated disk read-write operations. Initially, a virtual machine disk image may only comprise one raw or COW volume, which may be made read-only before the first boot of the virtual machine. An attempt to write to a disk by a virtual machine may trigger adding a new COW volume ("layer") to the volume chain. The newly created volume may be made writable, and may only store disk blocks or files which were modified or newly created by the virtual machine after the previous volume ("layer") had been made read-only. One or more volumes may be added to the volume chain during the lifetime of the virtual machine. Adding a new COW volume may be triggered by making the previous volume read-only (e.g., responsive to receiving a command via an administrative interface). The virtual disk device implemented by the hypervisor locates the data by accessing, transparently to the virtual machine, each volume of the chain of volumes, starting from the most recently added volume.

Figure 4:
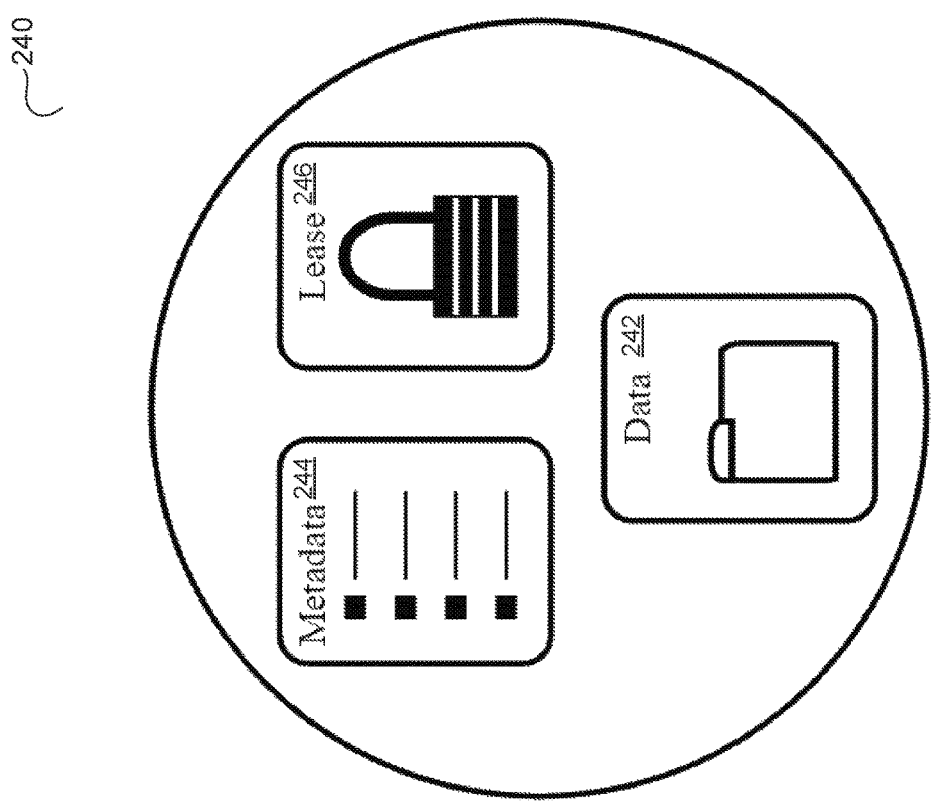
FIG. 4 schematically illustrates an example functional structure of a storage volume, in accordance with one or more aspects of the present disclosure.

Each volume 240 may comprise volume data area 242, volume metadata area 244, and volume lease area 246, as schematically illustrated by FIG. 4. In an illustrative example, example volume 240 may be implemented using file-based storage, in which case volume data area 242, volume metadata area 244, and volume lease area 246 may be provided by respective files. In an illustrative example, example volume 240 may be implemented using block-based storage, in which case volume data area 242 may be provided by a logical volume, while volume metadata area 244 and volume lease area 246 may be provided by segments of respective logical volumes storing metadata and lease information for a plurality of the storage domain volumes. The logical volume segments may be identified by an offset with respect to the logical volume starting block or by an index within an array of pointers identifying the logical volume segments corresponding to the storage domain volumes.

The volume data area may be employed for storing the disk image data. The volume metadata area may be employed for storing references to associated volumes (e.g., to parent or child volumes in a copy-on-write chain) and/or other information that may be utilized for volume identification, management, creation, modification, removal, and/or for performing file operations with respect to the files stored on the volume.

The volume lease area may be employed for storing the information that may be utilized for managing access to the volume. In certain implementations, the virtualization manager may provide a centralized locking facility to prevent conflicting access by hosts to the same volume. By obtaining a lease with respect to a volume, the host may receive an exclusive access to the volume which would prevent other hosts from accessing the volume while the lease is active. A lease may have a certain expiration period and may be extended by the requestor. Failure to timely extend a lease may lead to the expiration of the lease. The state of the current lease with respect to a given volume may be stored in the lease area of the volume.

The above-described multi-component structure of a volume results in complex storage-related operations, such as creating a volume, cloning a volume, or removing a volume. Therefore, each storage-related operation may involve a sequence of sub-operations to be performed on various objects of the storage domain. Some of those sub-operations may fail or never complete (e.g., due to power outages, network outages, hardware or software failures), thus leaving the storage in a non-predictable state. Certain recovery operations may need to be performed, proactively or at least responsive to detecting such a failure, in order to keep the storage in a coherent state. In accordance with one or more aspects of the present disclosure, certain storage-related operations, including but not limited to creating a volume, cloning a volume, or removing a volume, may be performed in the transactional mode of execution, such that a failed or incomplete transaction would be rolled back, thus leaving various storage objects in their respective pre-transactional states.

In certain implementations, a transaction may be opened by creating a transaction marker, as described in more details herein below. Subsequent operations may be performed in the transactional mode of execution, i.e., such operations may either collectively succeed or collectively fail. Each operation to be performed in the transactional mode of execution may be represented by either an atomic operation (in other words, an operation that is completely isolated from the rest of the system and cannot be interfered with by any concurrently executing processes) or by a nested transaction. The transaction may be completed by destroying the transaction marker, as described in more details herein below.

In accordance with one or more aspects of the present disclosure, the failure recovery may be performed by a process that is executed independently from the processes that execute the storage-related transactions. In an illustrative example, the virtualization manager may cause the failure recovery process to be executed periodically or responsive to detecting certain events. The failure recovery process may identify markers referencing failed transactions, and perform certain recovery procedures with respect to the storage objects, as described in more details herein below.

In file-based storage implementations, the transaction marker may be represented by a file that has a known file name (e.g., a pre-defined extension). The storage objects that are created or modified within the scope of the transaction may be associated with the marker by their respective file names. In certain implementations, a volume may be identified by a unique alphanumeric identifier, such as a Universally Unique Identifier (UUID). The name of the volume data file may be derived from the UUID by a first pre-defined transformation (e.g., may be represented by the UUID string with no extension). The name of the volume lease file may be derived from the UUID by a second pre-defined transformation (e.g., may be represented by the UUID string concatenated with a pre-defined extension, such as UUID.lease). The name of the volume metadata file may be derived from the UUID by a third pre-defined transformation (e.g., may be represented by the UUID string concatenated with a pre-defined extension, such as UUID.meta). The transaction marker may be created by renaming the volume metadata file using a fourth pre-defined transformation (e.g., the UUID string concatenated with the first pre-defined extension identifying the metadata file and a second pre-defined extension identifying the transaction marker, such as UUID.meta.tmp), and may be destroyed by reversing the rename operation (e.g., removing the second pre-defined extension).

In block-based storage implementations, the transaction marker may be represented by a known tag associated with a logical volume. The volume metadata area and volume lease area may be provided by segments of respective logical volumes storing metadata and lease information for a plurality of the storage domain volumes. The logical volume segments may be identified by an index within an array of pointers identifying the logical volume segments corresponding to the storage domain volumes. The transaction marker may be created by creating a logical volume representing the volume data area with a specified tag, and may be destroyed by removing the tag from the logical volume.

In an illustrative example, a volume create operation may be performed in the transactional mode of execution. Responsive to successfully acquiring a lock with respect to the storage domain containing the volume being created, the virtualization manager may initiate the transactional mode of execution by creating the transaction marker. As noted herein above, in the file-based storage implementations, the transaction marker may be represented by a volume metadata file, the file name of which has a pre-defined extension. In the block-based storage implementations, the transaction marker may be represented by a known tag associated with a logical volume implementing the volume data area.

Upon successfully creating the transaction marker, the virtualization manager may create the remaining components of the volume. In the file-based storage implementations, the data file and lease file may be created. In the block-based storage implementations, the metadata area and lease area may be created by allocating segments of respective logical volumes storing metadata and lease information for a plurality of the storage domain volumes. The logical volume segments may be identified by an index within an array of pointers identifying the logical volume segments corresponding to the storage domain volumes.

Upon completing the above-described other operations associated with volume creation, the virtualization manager may complete the transaction by destroying the transaction marker. In the file-based storage implementations, the transaction marker may be destroyed by removing a pre-defined extension from the name of the volume metadata file. In the block-based storage implementations, the transaction marker may be destroyed by removing a pre-defined tag from the logical volume representing the volume data area. Upon successfully destroying the transaction marker, the virtualization manager may release the previously acquired lock with respect to the storage domain containing the newly created volume.

As noted herein above, some of the above-identified operations may fail or never complete (e.g., due to power outages, network outages, hardware or software failures), thus leaving the storage in a non-predictable state. In accordance with one or more aspects of the present disclosure, a failure recovery process (also referred to as "garbage collector") may be employed to roll back a failed or incomplete transaction, thus leaving various storage objects in their respective pre-transactional states.

The virtualization manager may run the garbage collector process periodically, responsive to detecting a certain event, or evaluating a certain condition (e.g., free disk space falling below a specified threshold). The virtualization manager may specify a storage area (e.g., a storage domain or a disk image) to be scanned by the garbage collector instance. Upon initialization, the garbage collector instance may scan the specified storage area to identify any transaction markers that exist on storage. As noted herein above, in file-based storage implementations, the transaction marker may be represented by a file that has a known file name (e.g., a pre-defined extension); in block-based storage implementations, the transaction marker may be represented by a known tag associated with a logical volume.

The garbage collector may compile a list of all identified transaction markers and then acquire a lock with respect to the specified storage area. Upon successfully acquiring the lock, the garbage collector re-examines the states of the markers on the list and drops from the list any marker that was modified (e.g., renamed to a different file name) by another process before the lock had been acquired by the garbage collector. All markers remaining on the list reference abandoned or failed transactions, since a marker referencing an active transaction would be protected by a lock that was previously acquired by the process performing the transaction.

The garbage collector may then retrieve a marker from the list and identify the storage objects referenced by the marker. As noted herein above, the transaction marker may be represented by the volume metadata file having its filename (which may be provided the volume identifier string concatenated with a first pre-defined extension identifying the metadata file, e.g., UUID.meta) concatenated with a second pre-defined extension that identifies the transaction marker, e.g., UUID.meta.tmp. The name of the volume data file may be derived from the volume identifier by a first pre-defined transformation (e.g., may be represented by the volume identifier string with no extension). The name of the volume lease file may be derived from the volume identifier by a second pre-defined transformation (e.g., may be represented by the volume identifier string concatenated with a pre-defined extension, such as UUID.lease).

In block-based storage implementations, the transaction marker may be represented by a known tag associated with a logical volume. The volume metadata area and volume lease area may be provided by segments of respective logical volumes storing metadata and lease information for a plurality of the storage domain volumes. The logical volume segments may be identified by an index within an array of pointers identifying the logical volume segments corresponding to the storage domain volumes. The transaction marker may be created by creating a logical volume representing the volume data area with a specified tag, and may be destroyed by removing the rag from the logical volume.

Responsive to successfully identifying the storage objects referenced by the transaction maker, the garbage collector may destroy the identified storage objects, and may then execute an atomic operation to destroy the transaction marker. As noted herein above, in the file-based storage implementations, the transaction marker may be destroyed by removing a pre-defined extension from the name of the volume metadata file. In the block-based storage implementations, the transaction marker may be destroyed by removing a pre-defined tag from the logical volume representing the volume data area. Upon successfully destroying all transaction markers on the list, the garbage collector may release the previously acquired lock with respect to the specified storage area.

Figure 5:
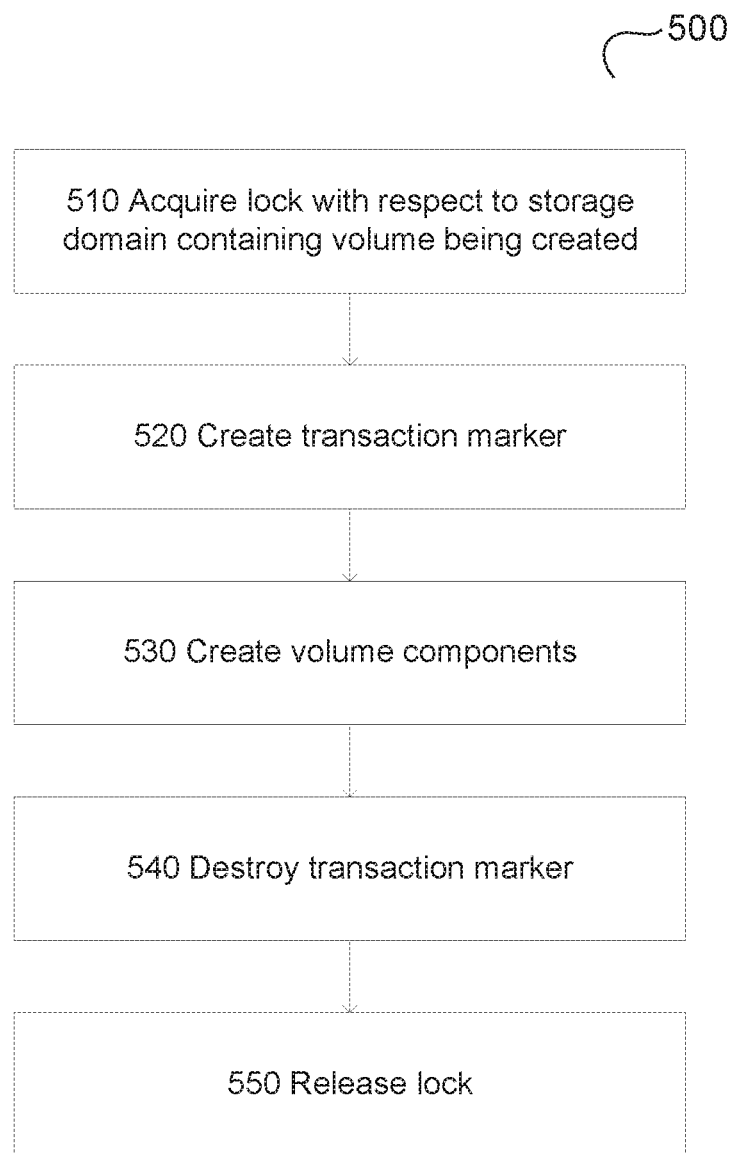
FIG. 5 depicts a flow diagram of an example method for creating a storage volume in the transactional mode of execution, in accordance with one or more aspects of the present disclosure.

FIG. 5 depicts a flow diagram of an example method for creating a storage volume in the transactional mode of execution, in accordance with one or more aspects of the present disclosure. Method 500 and/or each of its individual functions, routines, subroutines, or operations may be performed by one or more processing devices (e.g., one or more processing devices of computer system 100 of FIG. 1) executing the method. In an illustrative example, method 500 may be performed by virtualization manager 110 of FIG. 1. In certain implementations, method 500 may be performed by a single processing thread. Alternatively, method 500 may be performed by two or more processing threads, each thread executing one or more individual functions, routines, subroutines, or operations of the method. In an illustrative example, the processing threads implementing method 500 may be synchronized (e.g., using semaphores, critical sections, and/or other thread synchronization mechanisms). Alternatively, the processing threads implementing method 500 may be executed asynchronously with respect to each other.

At block 510, a processing device implementing the method may acquire a lock with respect to the storage domain containing the volume being created, as described in more details herein above.

At block 520, the processing device may initiate the transactional mode of execution by creating the transaction marker. As noted herein above, in the file-based storage implementations, the transaction marker may be represented by a volume metadata file, the file name of which has a pre-defined extension. In the block-based storage implementations, the transaction marker may be represented by a known tag associated with a logical volume implementing the volume data area, as described in more details herein above.

At block 530, the processing device may create the remaining components of the volume. In the file-based storage implementations, the data file and lease file may be created. In the block-based storage implementations, the metadata area and lease area may be created by allocating segments of respective logical volumes storing metadata and lease information for a plurality of the storage domain volumes. The logical volume segments may be identified by an index within an array of pointers identifying the logical volume segments corresponding to the storage domain volumes, as described in more details herein above.

At block 540, the processing device may complete the transaction by destroying the transaction marker. In the file-based storage implementations, the transaction marker may be destroyed by removing a pre-defined extension from the name of the volume metadata file. In the block-based storage implementations, the transaction marker may be destroyed by removing a pre-defined tag from the logical volume representing the volume data area, as described in more details herein above.

At block 550, the processing device may release the previously acquired lock with respect to the image containing the newly created volume, as described in more details herein above, and the method may terminate.

Figure 6A:
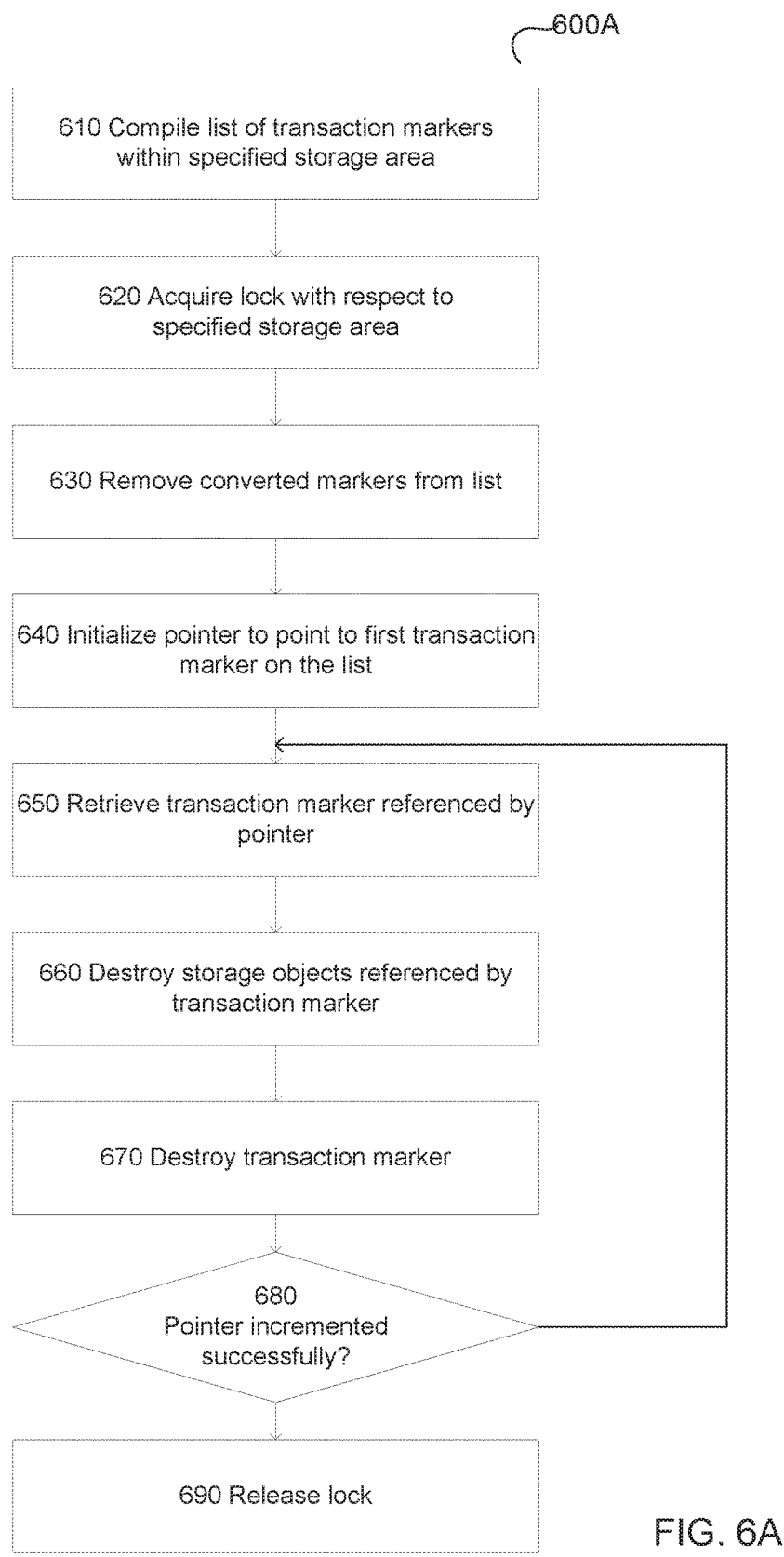
FIGS. 6A-6B depict flow diagrams of example methods for performing failure recovery with respect to shared storage operations, in accordance with one or more aspects of the present disclosure.

FIG. 6A depicts a flow diagram of an example method for performing failure recovery with respect to shared storage operations, in accordance with one or more aspects of the present disclosure. Method 600A and/or each of its individual functions, routines, subroutines, or operations may be performed by one or more processing devices (e.g., one or more processing devices of computer system 100 of FIG. 1) executing the method. In an illustrative example, method 600A may be performed by virtualization manager 110 of FIG. 1. In certain implementations, method 600A may be performed by a single processing thread. Alternatively, method 600A may be performed by two or more processing threads, each thread executing one or more individual functions, routines, subroutines, or operations of the method. In an illustrative example, the processing threads implementing method 600A may be synchronized (e.g., using semaphores, critical sections, and/or other thread synchronization mechanisms). Alternatively, the processing threads implementing method 600A may be executed asynchronously with respect to each other.

At block 610, a processing device implementing the method may scan a specified storage area to identify any transaction markers that exist on storage. In file-based storage implementations, the transaction marker may be represented by a file that has a known file name (e.g., a pre-defined extension); in block-based storage implementations, the transaction marker may be represented by a known tag associated with a logical volume. The garbage collector may compile a list of all identified transaction markers, as described in more details herein above.

At block 620, the processing device may acquire a lock with respect to the specified storage area, as described in more details herein above.

At block 630, the processing device may re-examine the states of the markers on the list and drops from the list any marker that was modified (e.g., renamed to a different file name) by another process before the lock had been acquired by the garbage collector, as described in more details herein above.

At block 640, the processing device may initialize a pointer to point to the first marker on the list.

At block 650, the processing device may retrieve from the list the transaction marker referenced by the pointer.

At block 660, the processing device may identify the storage objects referenced by the marker. Responsive to successfully identifying the storage objects referenced by the transaction maker, the garbage collector may destroy the identified storage objects, as described in more details herein above.

At block 670, the processing device may execute an atomic operation to destroy the transaction marker. In the file-based storage implementations, the transaction marker may be destroyed by removing a pre-defined extension from the name of the volume metadata file. In the block-based storage implementations, the transaction marker may be destroyed by removing a pre-defined tag from the logical volume representing the volume data area, as described in more details herein above.

At block 680, the processing device may increment the pointer to point to the next marker on the list. Responsive to successfully incrementing the pointer, the method may loop back to block 650; otherwise, responsive to determining that the list has been exhausted, the processing may continue at block 690.

At block 690, the processing device may release the previously acquired lock with respect to the image containing the specified storage area, as described in more details herein above, and the method may terminate.

Figure 6B:
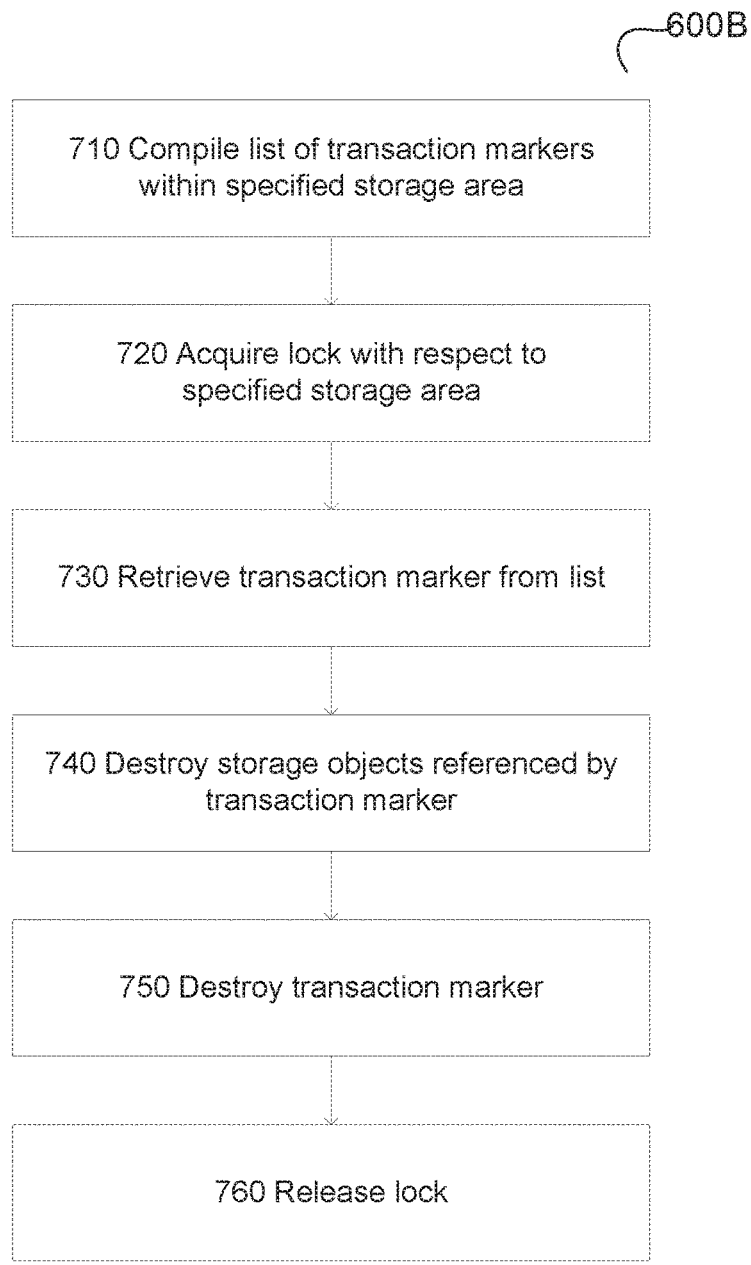

FIG. 6B depicts a flow diagram of another example method for performing failure recovery with respect to shared storage operations, in accordance with one or more aspects of the present disclosure. Method 600B and/or each of its individual functions, routines, subroutines, or operations may be performed by one or more processing devices (e.g., one or more processing devices of computer system 100 of FIG. 1) executing the method. In an illustrative example, method 600B may be performed by virtualization manager 110 of FIG. 1. In certain implementations, method 600B may be performed by a single processing thread. Alternatively, method 600B may be performed by two or more processing threads, each thread executing one or more individual functions, routines, subroutines, or operations of the method. In an illustrative example, the processing threads implementing method 600B may be synchronized (e.g., using semaphores, critical sections, and/or other thread synchronization mechanisms). Alternatively, the processing threads implementing method 600B may be executed asynchronously with respect to each other.

At block 710, a processing device implementing the method may scan a specified storage area to identify any transaction markers that exist on storage. In file-based storage implementations, the transaction marker may be represented by a file that has a known file name (e.g., a pre-defined extension); in block-based storage implementations, the transaction marker may be represented by a known tag associated with a logical volume. The garbage collector may compile a list of all identified transaction markers, as described in more details herein above.

At block 720, the processing device may acquire a lock with respect to the specified storage area, as described in more details herein above.

At block 730, the processing device may retrieve a transaction marker from the list. In certain implementations, operations referenced by block 730 may iteratively be repeated for each transaction marker of a plurality of transaction markers comprised by the list, as described in more details herein above.

At block 740, the processing device may identify the storage objects referenced by the marker. Responsive to successfully identifying the storage objects referenced by the transaction maker, the garbage collector may destroy the identified storage objects, as described in more details herein above.

At block 750, the processing device may execute an atomic operation to destroy the transaction marker. In the file-based storage implementations, the transaction marker may be destroyed by removing a pre-defined extension from the name of the volume metadata file. In the block-based storage implementations, the transaction marker may be destroyed by removing a pre-defined tag from the logical volume representing the volume data area, as described in more details herein above.

At block 760, the processing device may release the previously acquired lock with respect to the image containing the specified storage area, as described in more details herein above, and the method may terminate.

Thus, implementations of the present disclosure employ various objects created on the storage by various storage-related operations as the sole basis for performing roll-back operations in the event of transaction failure; in contrast to common transaction-based operation approach, no transaction log is maintained or required for performing transaction roll-back.

While the foregoing examples illustrate volume creation operations, a similar transactional-based approach may be implemented with respect to other storage-related operations, including but not limited to cloning a volume or removing a volume.

Figure 7:
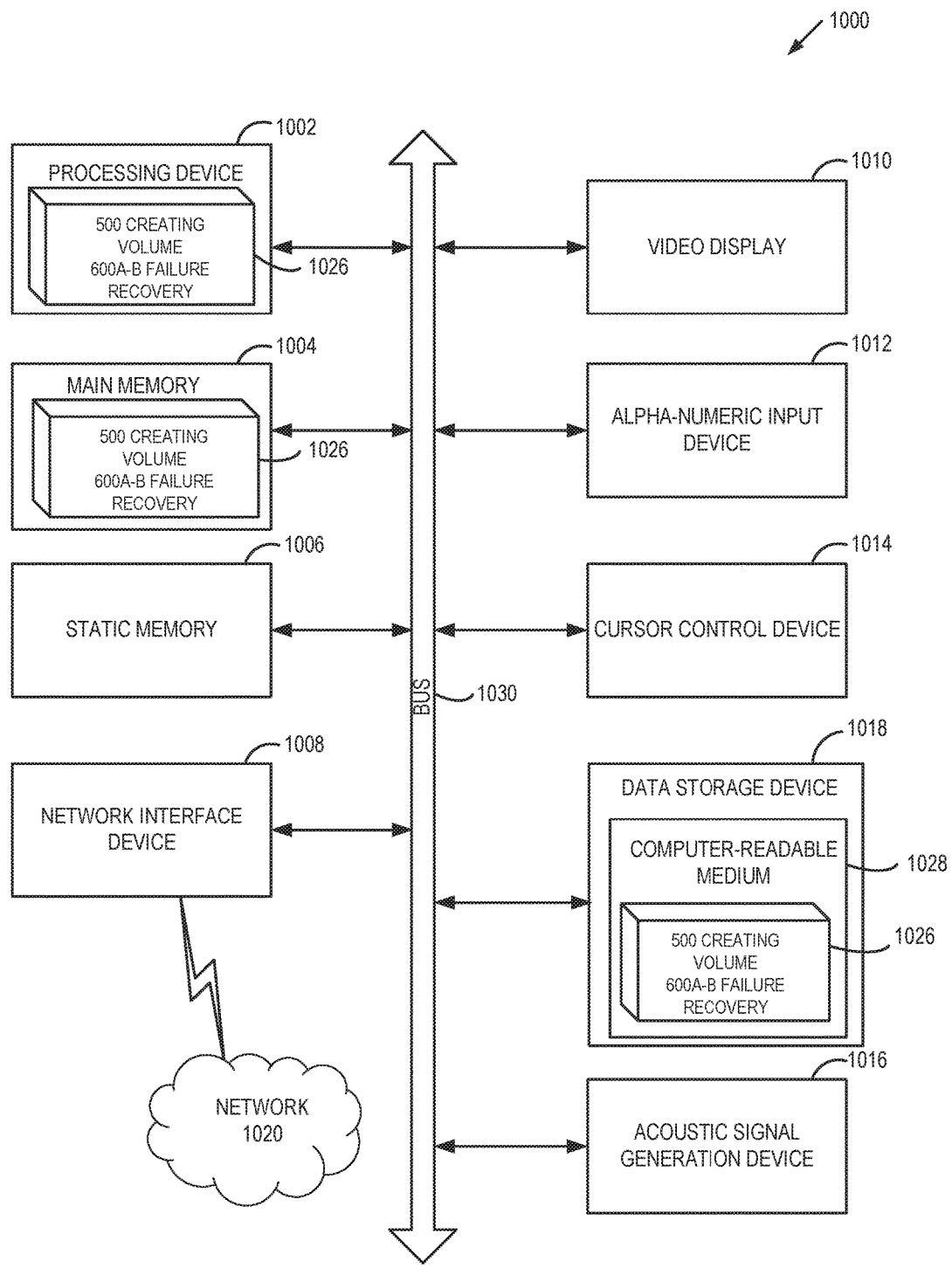
FIG. 7 depicts a block diagram of an illustrative computing device operating in accordance with the examples of the present disclosure.

FIG. 7 schematically illustrates a component diagram of an example computer system 1000 which can perform any one or more of the methods described herein. In various illustrative examples, computer system 1000 may correspond to host computer system 115, 120 of FIG. 1.

Example computer system 1000 may be connected to other computer systems in a LAN, an intranet, an extranet, and/or the Internet. Computer system 1000 may operate in the capacity of a server in a client-server network environment. Computer system 1000 may be a personal computer (PC), a set-top box (STB), a server, a network router, switch or bridge, or any device capable of executing a set of instructions (sequential or otherwise) that specify actions to be taken by that device. Further, while only a single example computer system is illustrated, the term "computer" shall also be taken to include any collection of computers that individually or jointly execute a set (or multiple sets) of instructions to perform any one or more of the methods discussed herein.

Example computer system 1000 may comprise a processing device 1002 (also referred to as a processor or CPU), a main memory 1004 (e.g., read-only memory (ROM), flash memory, dynamic random access memory (DRAM) such as synchronous DRAM (SDRAM), etc.), a static memory 1006 (e.g., flash memory, static random access memory (SRAM), etc.), and a secondary memory (e.g., a data storage device 1018), which may communicate with each other via a bus 1030.

Processing device 1002 represents one or more general-purpose processing devices such as a microprocessor, central processing unit, or the like. More particularly, processing device 1002 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 1002 may also be one or more special-purpose processing devices such as an application specific integrated circuit (ASIC), a field programmable gate array (FPGA), a digital signal processor (DSP), network processor, or the like. In accordance with one or more aspects of the present disclosure, processing device 1002 may be configured to execute instructions of host management module 112 implementing method 500 for creating a storage volume in the transactional mode of execution and/or methods 600A-B for performing failure recovery with respect to shared storage operations, in accordance with one or more aspects of the present disclosure.

Example computer system 1000 may further comprise a network interface device 1008, which may communicatively coupled to a network 1020. Example computer system 1000 may further comprise a video display 1010 (e.g., a liquid crystal display (LCD), a touch screen, or a cathode ray tube (CRT)), an alphanumeric input device 1012 (e.g., a keyboard), a cursor control device 1014 (e.g., a mouse), and an acoustic signal generation device 1016 (e.g., a speaker).

Data storage device 1018 may include a computer-readable storage medium (or more specifically a non-transitory computer-readable storage medium) 1028 on which is stored one or more sets of executable instructions 1026. In accordance with one or more aspects of the present disclosure, executable instructions 1026 may comprise executable instructions encoding various functions of host management module 112, including method 500 for creating a storage volume in the transactional mode of execution and/or methods 600A-B for performing failure recovery with respect to shared storage operations, in accordance with one or more aspects of the present disclosure.

Executable instructions 1026 may also reside, completely or at least partially, within main memory 1004 and/or within processing device 1002 during execution thereof by example computer system 1000, main memory 1004 and processing device 1002 also constituting computer-readable storage media. Executable instructions 1026 may further be transmitted or received over a network via network interface device 1008.

While computer-readable storage medium 1028 is shown in FIG. 4 as a single medium, the term "computer-readable storage medium" should be taken to include a single medium or multiple media (e.g., a centralized or distributed database, and/or associated caches and servers) that store the one or more sets of VM operating instructions. The term "computer-readable storage medium" shall also be taken to include any medium that is capable of storing or encoding a set of instructions for execution by the machine that cause the machine to perform any one or more of the methods described herein. The term "computer-readable storage medium" shall accordingly be taken to include, but not be limited to, solid-state memories, and optical and magnetic media.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "identifying," "determining," "storing," "adjusting," "causing," "returning," "comparing," "creating," "stopping," "loading," "copying," "throwing," "replacing," "performing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Examples of the present disclosure also relate to an apparatus for performing the methods described herein. This apparatus may be specially constructed for the required purposes, or it may be a general purpose computer system selectively programmed by a computer program stored in the computer system. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The methods and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear as set forth in the description below. In addition, the scope of the present disclosure is not limited to any particular programming language. It will be appreciated that a variety of programming languages may be used to implement the teachings of the present disclosure.

It is to be understood that the above description is intended to be illustrative, and not restrictive. Many other implementation examples will be apparent to those of skill in the art upon reading and understanding the above description. Although the present disclosure describes specific examples, it will be recognized that the systems and methods of the present disclosure are not limited to the examples described herein, but may be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

The invention claimed is:

1. A method, comprising:
   acquiring, by a processing device, a lock with respect to a storage domain comprising a specified disk image;
   creating a transaction marker associated with the disk image, wherein the transaction marker is represented by a metadata file having a name comprising a pre-defined extension;
   creating a component of a new volume associated with the disk image;
   destroying the transaction marker by removing the extension from the name of the metadata file representing the transaction marker; and
   releasing the lock with respect to the storage domain.

2. The method of claim 1, wherein the component of the new volume is provided by one of: a data file or a lease file.

3. The method of claim 1, wherein the component of the new volume is provided by one of: a metadata area residing on a block-based storage device or a lease area residing on a block-based storage device.

4. A method, comprising:
   scanning, by a processing device running a first process, a specified storage area to compile a list of transaction markers;
   acquiring a lock with respect to the specified storage area;
   identifying, in the list, a first transaction marker that was modified by a second process before the lock has been acquired by the first process;
   removing the first transaction marker from the list;
   retrieving a second transaction marker from the list;
   destroying a storage object referenced by the second transaction marker;
   destroying the second transaction marker; and
   releasing the lock with respect to the specified storage area.

5. The method of claim 4, wherein the transaction marker is provided by a metadata file having a pre-defined filename extension.

6. The method of claim 4, wherein the transaction marker is provided by a pre-defined tag associated with a logical volume residing on a block-based storage device, wherein the logical volume implements a data area of the new volume.

7. The method of claim 1, wherein the storage object referenced by the marker is provided by one of: a data file or a lease file.

8. The method of claim 1, wherein the storage object referenced by the marker is provided by one of: a metadata area residing on a block-based storage device or a lease area residing on a block-based storage device.

9. The method of claim 4, wherein destroying the transaction marker further comprises:
   removing a pre-defined extension from a name of a volume metadata file.

10. The method of claim 4, wherein destroying the transaction marker further comprises:
    removing a pre-defined tag from a logical volume residing on a block-based storage device, wherein the logical volume represents a volume data area.

11. A computer-readable non-transitory storage medium comprising executable instructions that, when executed by a processing device, cause the processing device to:
    scan a specified storage area to compile a list of transaction markers;
    acquire a lock with respect to the specified storage area;
    identifying, in the list, a first transaction marker that was modified by another process before the lock has been acquired;
    removing the first transaction marker from the list;
    retrieve a second transaction marker from the list;
    destroy a storage object referenced by the second transaction marker;
    destroy the second transaction marker; and
    release the lock with respect to the specified storage area.

12. The computer-readable non-transitory storage medium of claim 11, wherein the transaction marker is provided by a pre-defined tag associated with a logical volume residing on a block-based storage device, wherein the logical volume implements a data area of the new volume.

13. The computer-readable non-transitory storage medium of claim 11, wherein destroying the transaction marker further comprises:
    removing a pre-defined extension from a name of a volume metadata file.

14. The computer-readable non-transitory storage medium of claim 11, wherein destroying the transaction marker further comprises:
    removing a pre-defined tag from a logical volume residing on a block-based storage device, wherein the logical volume represents a volume data area.

* * * * *